(12) United States Patent
Tanaka

(10) Patent No.: US 7,149,324 B2
(45) Date of Patent: Dec. 12, 2006

(54) ELECTRONIC WATERMARK INSERTION DEVICE, DETECTION DEVICE, AND METHOD

(75) Inventor: Nobuyuki Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 768 days.

(21) Appl. No.: 09/895,217

(22) Filed: Jul. 2, 2001

(65) Prior Publication Data

US 2002/0012446 A1    Jan. 31, 2002

(30) Foreign Application Priority Data

Jul. 5, 2000    (JP)    ............................. 2000-204080

(51) Int. Cl.
*G06K 9/00*    (2006.01)
(52) U.S. Cl. ...................... 382/100; 382/248; 382/250; 713/176
(58) Field of Classification Search ................ 382/100, 382/250, 232, 248; 713/176
See application file for complete search history.

(56) References Cited

U.S. PATENT DOCUMENTS

| | | | | |
|---|---|---|---|---|
| 6,192,138 B1* | 2/2001 | Yamadaji | ..................... | 382/100 |
| 6,285,775 B1* | 9/2001 | Wu et al. | ..................... | 382/100 |
| 6,310,962 B1* | 10/2001 | Chung et al. | ................ | 382/100 |
| 6,374,036 B1* | 4/2002 | Ryan et al. | .................... | 386/94 |
| 6,427,020 B1* | 7/2002 | Rhoads | ........................ | 382/100 |
| 6,453,053 B1* | 9/2002 | Wakasu | ....................... | 382/100 |
| 6,643,382 B1* | 11/2003 | Maeda | ........................ | 382/100 |
| 6,668,068 B1* | 12/2003 | Hashimoto | .................. | 382/100 |
| 6,707,465 B1* | 3/2004 | Yamazaki et al. | .......... | 345/629 |
| 6,798,893 B1* | 9/2004 | Tanaka | ........................ | 382/100 |

FOREIGN PATENT DOCUMENTS

| | | |
|---|---|---|
| JP | 10-155151 | 6/1998 |
| JP | 11-313292 | 11/1999 |
| WO | WO 00/11599 | 3/2000 |

OTHER PUBLICATIONS

Wu, et al., "Image Refining Technique Using Digital Watermarking," Oct. 6, 1999, IEEE, pp. 1-5.*

* cited by examiner

*Primary Examiner*—Jingge Wu
*Assistant Examiner*—Shefali Patel
(74) *Attorney, Agent, or Firm*—Whitham, Curtis, Christofferson & Cook, P.C.

(57) ABSTRACT

The use of the undefined low-order four bits of an 8-bit watermark is defined and, when contents are reproduced, a predetermined operation is performed according to the information stored in the low-order four bits. That is, a watermark is added to an original image to create an image with the watermark inserted. When the contents are reproduced, the watermark is detected in the image and, based on the information stored in the low-order four bits of the detected watermark, a predetermined operation, for example, access to a web site on the Internet, is performed.

13 Claims, 9 Drawing Sheets

CHARACTER STRING DISPLAY BY ELECTRONIC WATERMARK DATA

DEFINITION IN TABLE FILE

| LOW-ORDER 4 BITS | DISPLAY CONTENTS |
|---|---|
| 0000 | DO NOT DISPLAY |
| 0001 | DISPLAY ADVERTISEMENT OF COMPANY A. |
| 0010 | DISPLAY ADVERTISEMENT OF COMPANY B. |
| ⋮ | ⋮ |

WEB ACCESS BY ELECTRONIC WATERMARK DATA

DEFINITION IN TABLE FILE

| LOW-ORDER 4 BITS | DISPLAY CONTENTS |
|---|---|
| 0000 | DO NOT DISPLAY |
| 0001 | ACCESS http://abc |
| 0010 | ACCESS http://def |
| ⋮ | ⋮ |

APPLICATION STARTUP BY
ELECTRONIC WATERMARK DATA

701 DIGITAL CONTENTS
702
703 REPRODUCTION SCREEN
704 AP

DEFINITION IN TABLE FILE

| LOW-ORDER 4 BITS | DISPLAY CONTENTS |
|---|---|
| 0000 | DO NOT DISPLAY |
| 0001 | START APPLICATION A |
| 0010 | START APPLICATION B |
| ⋮ | ⋮ |

705

ELECTRONIC WATERMARK INSERTION DEVICE, DETECTION DEVICE, AND METHOD

BACKGROUND OF THE INVENTION

1. Field of the Invention

The present invention relates to a digital image, and more particularly to a device that inserts identification data, which has special information, into a digital image and a device that detects the identification data.

2. Description of the Related Art

Recently, more and more data recorded on media is digitized. On the other hand, an illegal copy of data, brought by data digitization, has become a serious social problem. Electronic watermark (hereinafter called a watermark) insertion and detection technology, designed for preventing illegal copies, is now being studied for practical use. Watermark technology, a technology for embedding a sort of invisible ID information as a noise, is characterized in that embedded information that constantly coexists with contents cannot be erased or modified easily. Taking advantage of these characteristics, watermark insertion/detection technology prevents contents, such as video data, from being illegally copied.

As an example of electronic watermark technology, a method for embedding a watermark is proposed in which, after an image is frequency-converted, the watermark is embedded into an area where the frequency of video signal components is high. Because a watermark is embedded into a high-frequency component area in this method, the watermark will not be removed even if image processing, such as compression/decompression and filtering, is performed. The watermark embedded in this way is removed only when the original image is destroyed. In addition, arranging watermarks based on random numbers generated according to normal distribution avoids interference among watermarks, preventing image quality from being degraded.

This method embeds a watermark in the following steps. First, the original image is converted to frequency components using, for example, DCT (discrete cosine transform), and n data pieces, $f(1), f(2), \ldots, f(n)$, each high in the frequency region, are selected. Then, watermarks, $w(1), w(2), \ldots, w(n)$ are selected from those arranged according to normal distribution (average is 0, covariance is 1) and, for each i, the following calculation is executed.

$$F(i)=f(i)+\alpha \times |f(i)| \times w(i)$$

where, $\alpha$ is a scaling element.

Then, performing inverse DCT for F(i) gives an image in which a watermark is embedded.

This method detects a watermark in the following steps. This method requires that the original image f(i) and a watermark candidate w(i) (where, i=1, 2, ..., n) be known.

First, an image with a watermark embedded is converted to frequency components using DCT. Let $F(1), F(2), \ldots, F(n)$ be the values of elements corresponding to $f(1), f(2), \ldots, f(n)$ each of which has a watermark embedded in the frequency region. A watermark W(i) is calculated and extracted using f(i) and F(i) as follows:

$$W(i)=(F(i)-f(i))/f(i)$$

Next, the statistical similarity between w(i) and W(i) is calculated using the inner product of the vector as follows:

$$C = W \cdot w / (WD \times wD)$$

where, $$W=(W(1), W(2), \ldots, W(n)),$$

$$w=(w(1), w(2), \ldots, w(n)),$$

WD is the absolute value of vector W, wD is the absolute value of vector w, and is the inner product of the vector. When the statistical similarity C is a value equal to or larger than a specific value, it is judged that the watermark is embedded.

If a watermark is embedded in this method, the copyright holder of the original image may find the source of digital image data that is illegally copied. This method, which requires an original image, allows the copyright holder to detect a watermark only when he or she has the original image of image data which is thought to be copied illegally. However, on a terminal reproducer where the original image is not available, this method cannot be used to detect a watermark.

To solve this problem, a method improved for use on a terminal, especially for use in an MPEG system, is proposed. This method divides the original image into 8×8 pixel blocks and embeds and extracts a watermark into and from those blocks, one block at a time.

This method embeds a watermark in the following steps. First, let $f(1), f(2), \ldots, f(n)$ be the frequency components in the frequency region, arranged in AC frequency ascending order, for which discrete cosine transfer has been performed during MPEG compression. Then, watermarks $w(1), w(2), \ldots, w(n)$ are selected from those arranged according to normal distribution (average is 0, covariance is 1) and, for each i, the following calculation is executed, $$F(i)=f(i)+\alpha \times avg(f(i)) \times w(i)$$

where, $\alpha$ is a scaling element, and avg(f(i)) is a partial average of the absolute values in three points near f(i).

Then, processing that follows MPEG processing is performed using F(i) instead of f(i).

This method detects a watermark in the following steps. This method does not require the original image; only the watermark candidates w(i) (where, i=1, 2, ..., n) need be known.

First, let $F(1), F(2), \ldots, F(n)$ be the frequency components in the frequency region, arranged in frequency ascending order, for which de-quantization has been performed during MPEG decompression. With the absolute value of the average of three points near F(i), that is, F(i−1), F(i), and F(i+1), as the partial average avg(F(i)), watermark W(i) is calculated from W(i)=F(i)/avg(F(i)) and, for each i, the total WF(i) of W(i) for one image is calculated.

Then, the statistical similarity of w(i) and WF(i) is calculated from $C = WF \cdot w / (WFD \times wD)$ using the inner product of the vector. When the statistical similarity C is a value equal to or larger than a specific value, it is judged that the watermark is embedded.

FIG. 8 shows the configuration of a device that inserts an electronic watermark into MPEG-compressed image data. In the figure, numeral 802 indicates a DCT transformer that performs DCT (discrete cosine) transformation for an original image 801 and outputs DCT-transformed data, numeral 803 indicates a watermark inserter that puts watermark weighs on the DCT coefficients as described above, numeral 804 indicates a quantizer that quantizes the DCT coefficients into which a watermark is inserted, numeral 805 indicates a de-quantizer that de-quantizes quantized data, numeral 806 indicates an IDCT transformer that performs IDCT(inverse discrete cosine transform) for de-quantized data, numeral 807 indicates an image into which a watermark is inserted, numeral 808 indicates a Huffman encoder that performs Huffman coding to compress quantized data, and numeral 809 indicates data compressed through Huffman encoding. The device with this configuration inserts a watermark into the original image 801 and then provides general users with the compressed data 809 into which a watermark is inserted.

FIG. 9 shows the configuration of a device that decodes the contents into which a watermark is inserted. In the figure, numeral 902 indicates a decoder that decodes compressed data 901 into which a watermark is inserted, numeral 903 indicates an IDCT transformer that performs IDCT for decoded data, and numeral 904 indicates a watermark detector that detects a watermark in data for which IDCT has been performed as described above. The device with this configuration detects a watermark inserted in the contents.

On the other hand, the configuration of a watermark is shown in FIG. 10. The high-order four bits of an eight-bit watermark contains information defined by the electronic watermark promotion organization. More specifically, the high-order two bits are defined as the CCI (copy protection) bits and bits 3–4 are reserved. The low-order four bits are undefined.

The use of only the high-order four bits are defined with the low-order four bits undefined as described above. How to use the remaining low-order four bits, reserved for future use, is a problem.

SUMMARY OF THE INVENTION

Object of the Invention

Accordingly, it is an object of the present invention to provide an electronic watermark insertion/detection device that efficiently uses the low-order four bits included but not defined in a watermark.

The present invention is characterized in that the undefined low-order four bits of an 8-bit watermark are defined for specific use and in that, at contents reproduction time, a predetermined operation is performed based on the information included in the low-order four bits. That is, as shown in FIG. 1, the device according to the present invention embeds a watermark 102 into an original image 101 to create an image in which the watermark is inserted. At contents reproduction time, the device detects the watermark included in the image and performs a predetermined operation based on the information stored in the low-order four bits of the detected watermark.

DETAILED DESCRIPTION OF THE PREFERRED EMBODIMENTS

An embodiment of a watermark insertion/detection device according to the present invention will be described with reference to the attached drawings.

Figure 1:
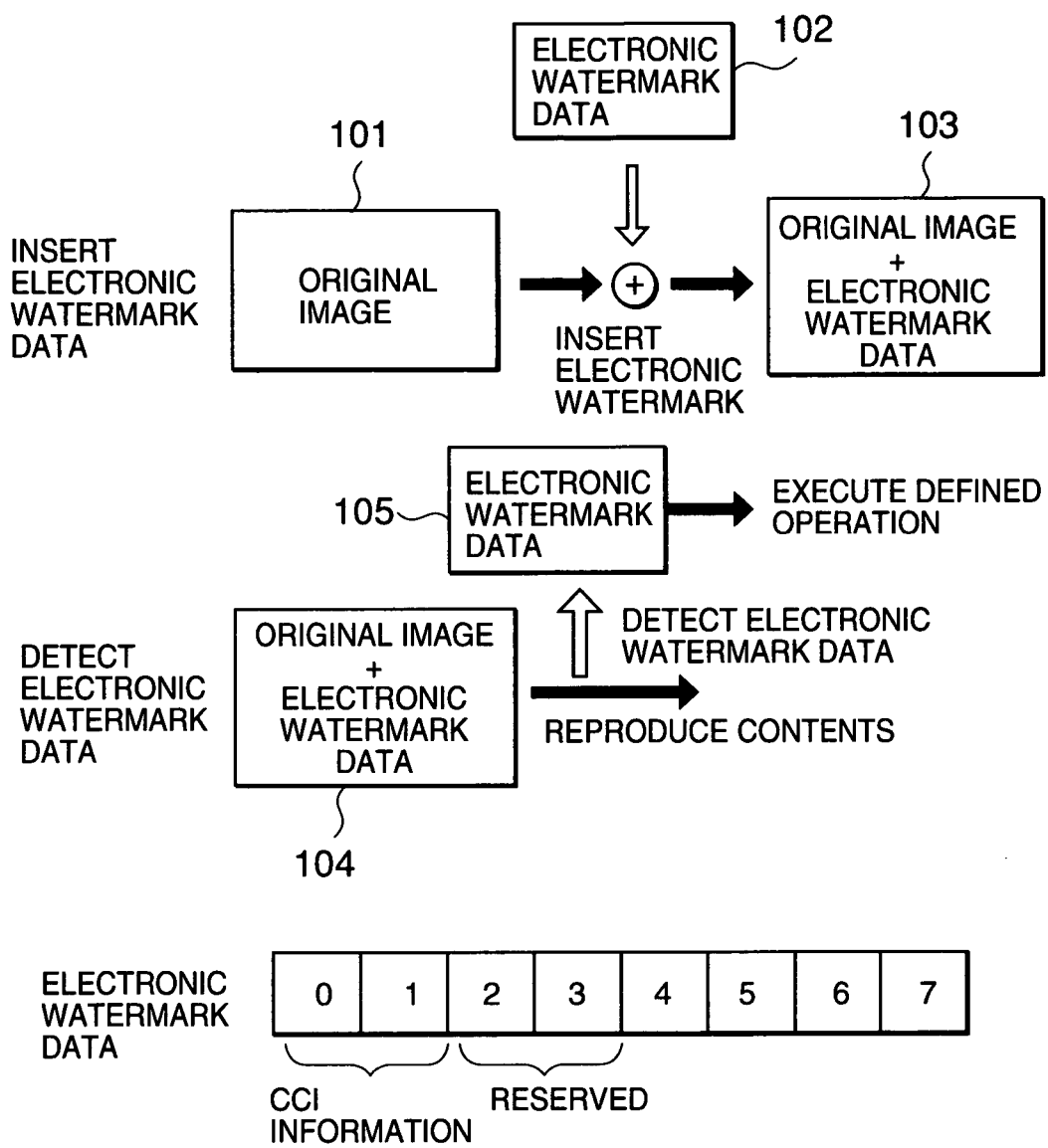
FIG. 1 is a block diagram showing the concept of the present invention.
Figure 2:
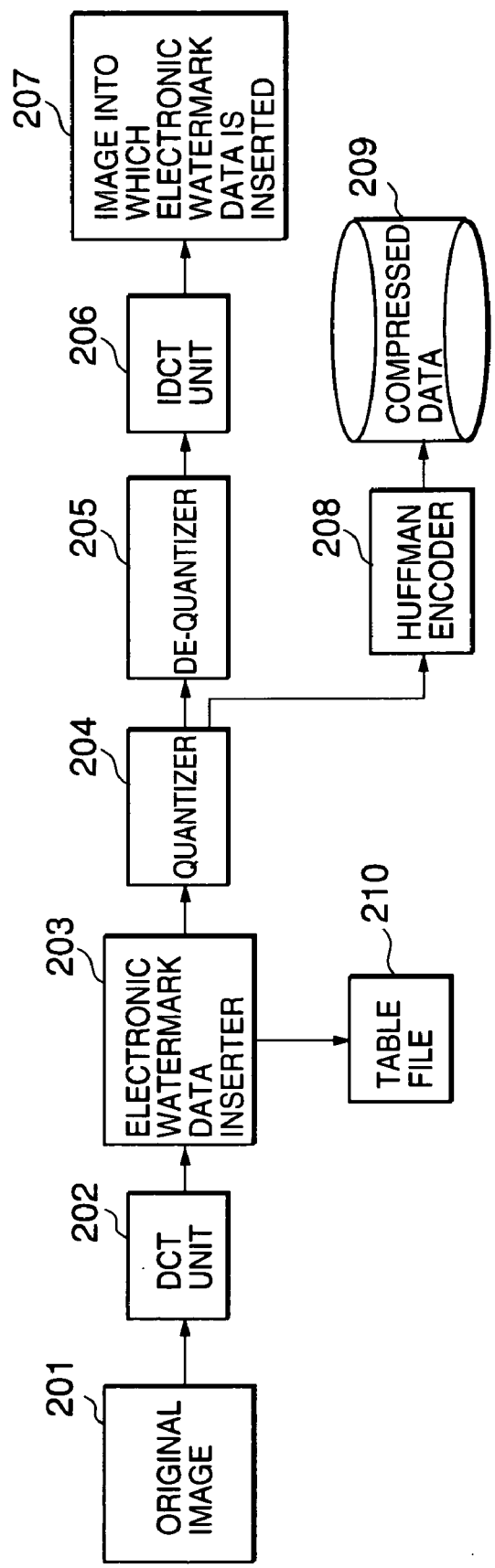
FIG. 2 is a block diagram showing an embodiment of an electronic watermark insertion device according to the present invention.
Figure 8:
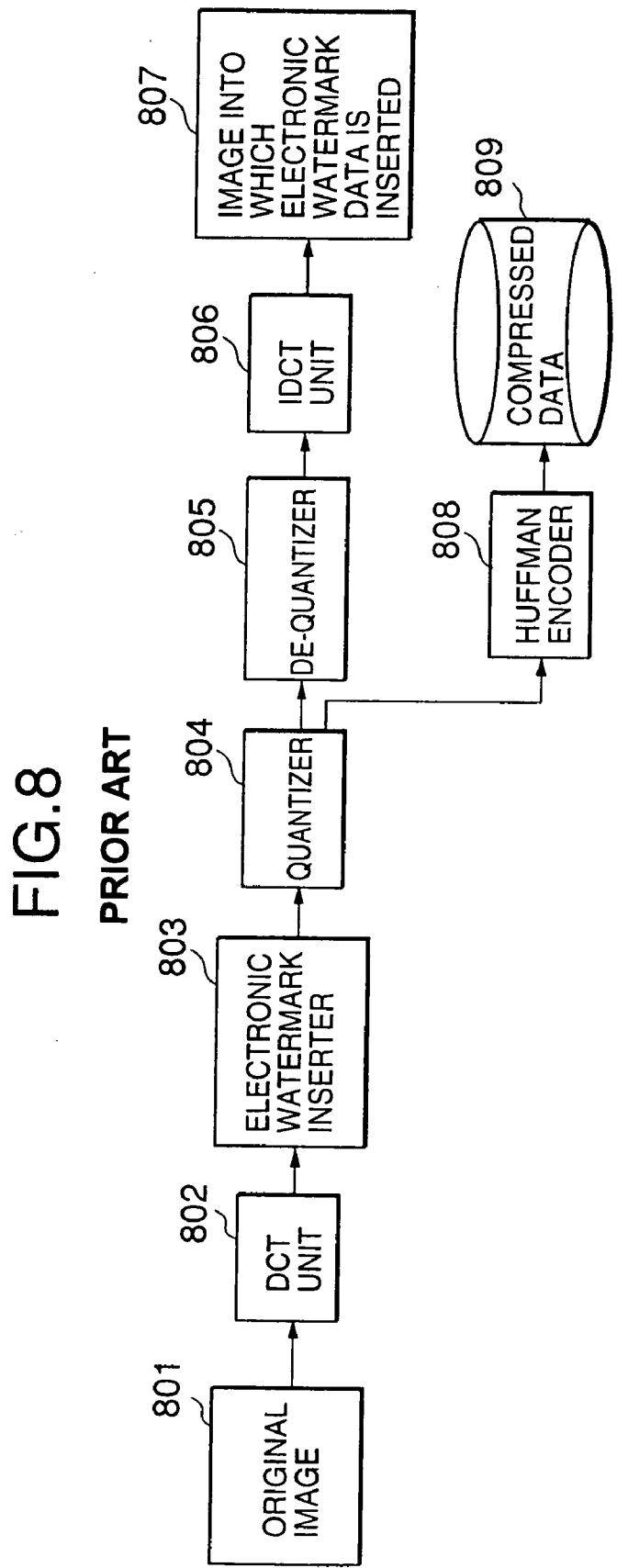
FIG. 8 is a block diagram showing a conventional electronic watermark insertion device.

FIG. 2 is a block diagram showing a watermark insertion device. This watermark insertion device differs from a prior-art device shown in FIG. 8 in that predetermined information is saved in a table file 210.

Figure 3:
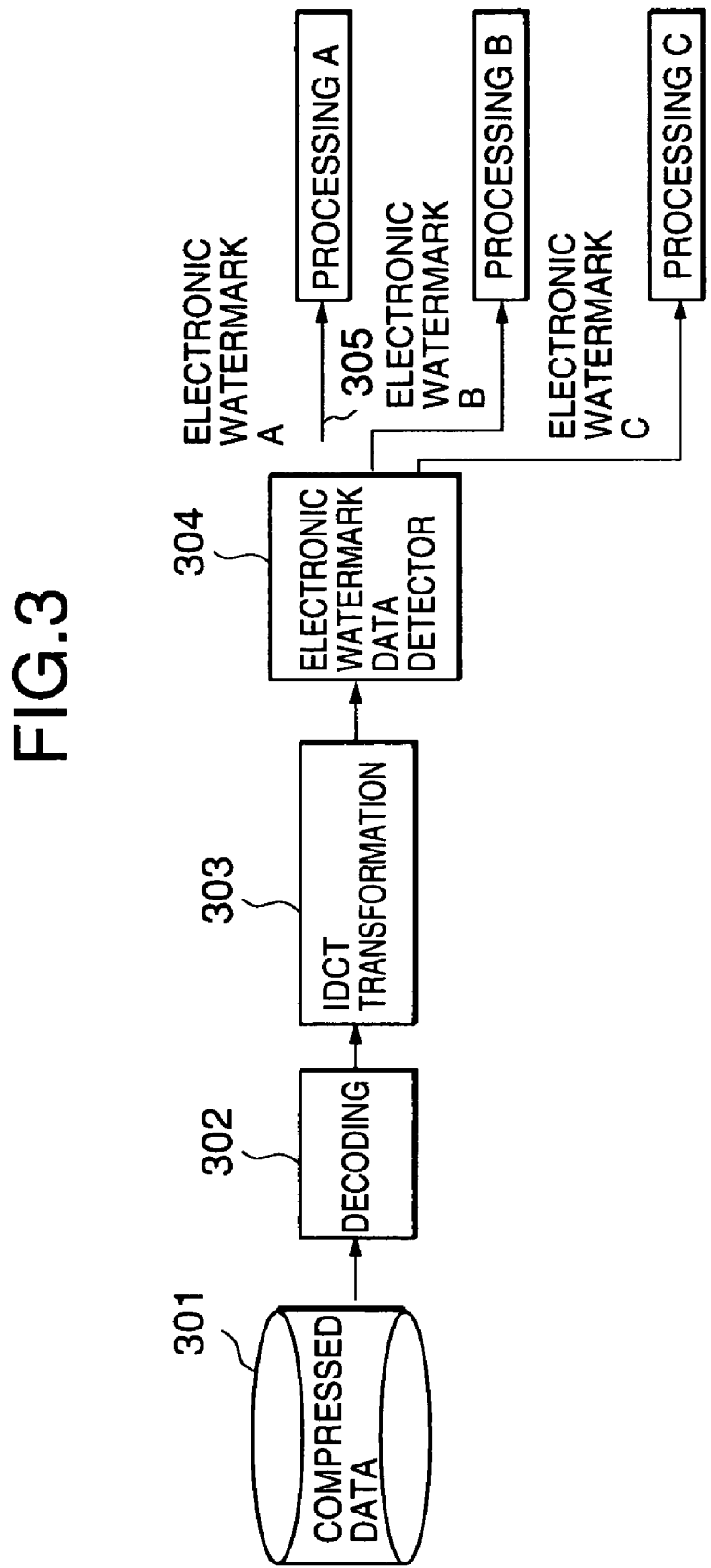
FIG. 3 is a block diagram showing an embodiment of an electronic watermark detection device according to the present invention.
Figure 4:
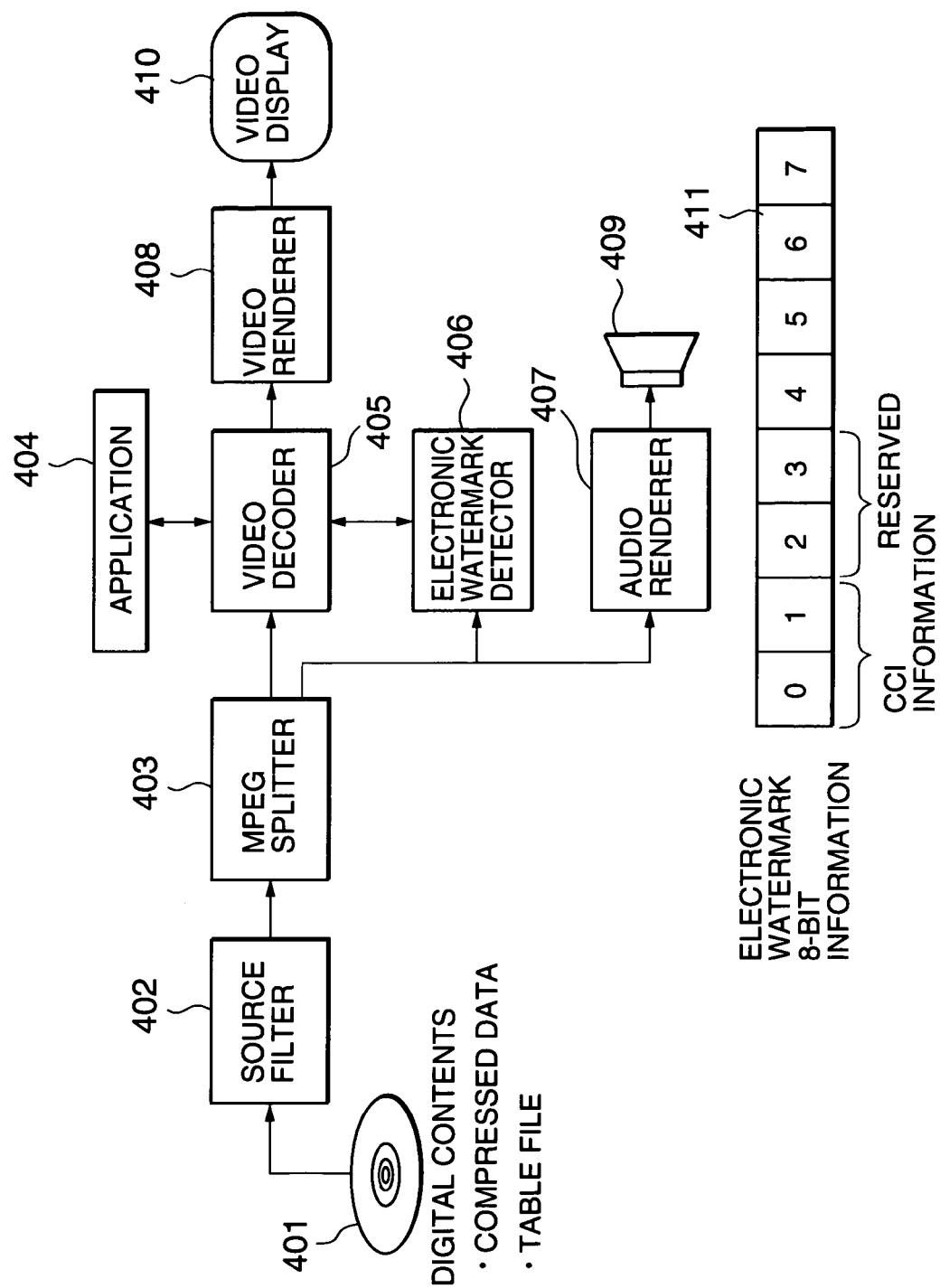
FIG. 4 is a block diagram showing a system to which the electronic watermark detection device according to the present invention is applied.
Figure 9:
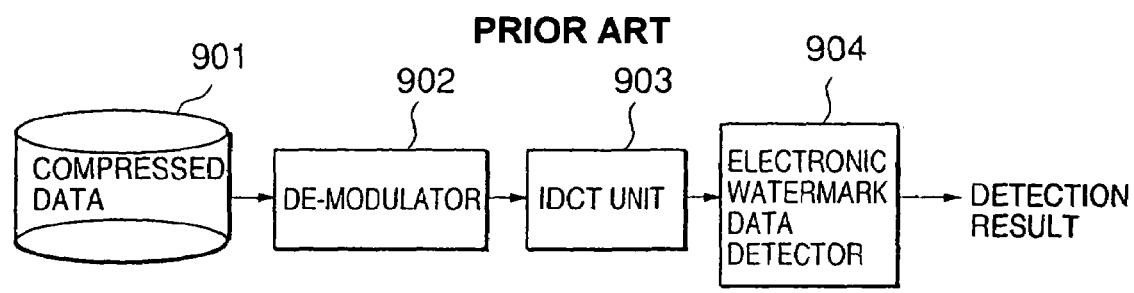
FIG. 9 is a block diagram showing a conventional electronic watermark detection device.
Figure 10:
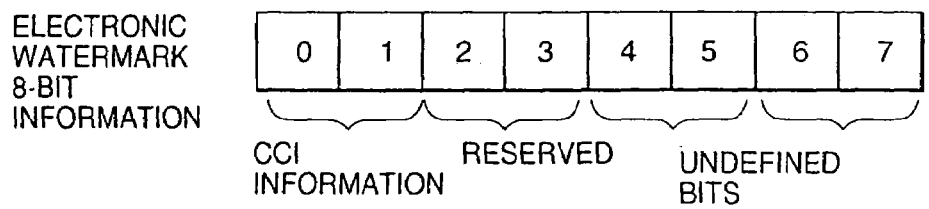
FIG. 10 is a diagram showing the configuration of a conventional watermark.

On the other hand, FIG. 3 is a block diagram showing a watermark detection device. This watermark detection device differs from a prior-art device shown in FIG. 9 in that, after the watermark is detected, processing is performed according to the detected watermark.

The operation of the present invention will be described below.

Figure 5:
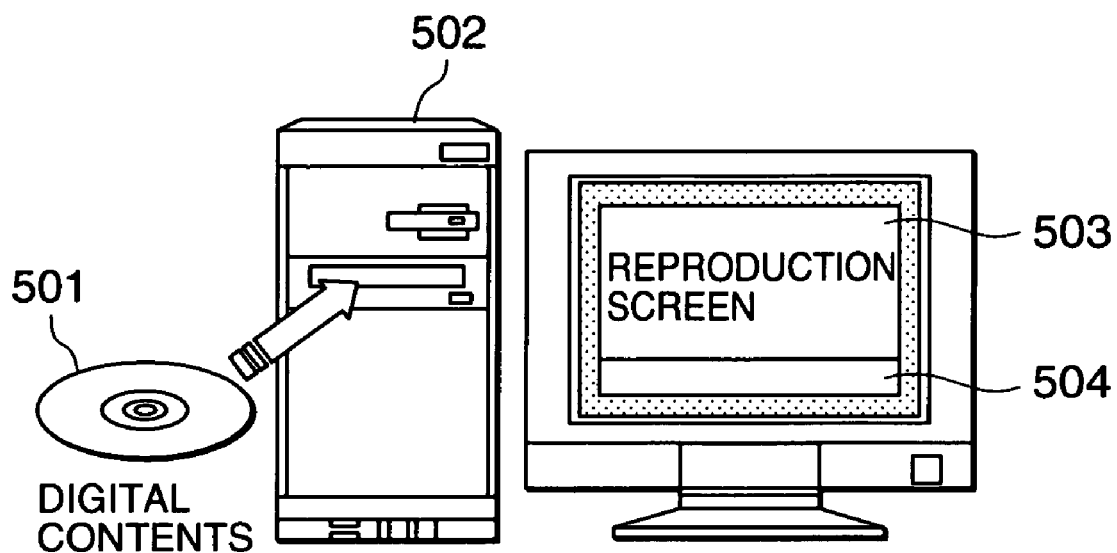
FIG. 5 is a block diagram showing the embodiment of the present invention.

First, FIG. 5 shows an example of character information displayed based on the low-order four bits of the watermark. In the figure, numeral 501 indicates digital contents. The digital contents contain image data into which the watermark is inserted as well as a table file 505 defining the low-order four bits of the watermark. Numeral 502 indicates a computer that reproduces the digital contents and detects the watermark. Numeral 503 indicates a reproduction screen on which reproduced image data is displayed. Numeral 504 indicates a screen on which character information is displayed.

The computer 502 reads image data and the table file 505 from a recording medium on which digital contents are recorded. Next, the computer 502 reproduces the image data and displays it on the reproduction screen 503. In parallel with this operation, the computer 502 extracts a watermark from the image data that was read, compares the low-order four bits of the watermark with the information defined in the table file 505 and, based on the comparison result, performs a predetermined operation. For example, when the low-order four bits are [0000], the computer does not display data on the screen 504. When the low-order four bits are [0001], the computer displays the advertisement of company A on the screen 504. When the low-order four bits are [0010], the computer displays the advertisement of company B. Note that advertisement data that is displayed is pre-stored in the digital contents 501 or in the computer 502.

Figure 6:
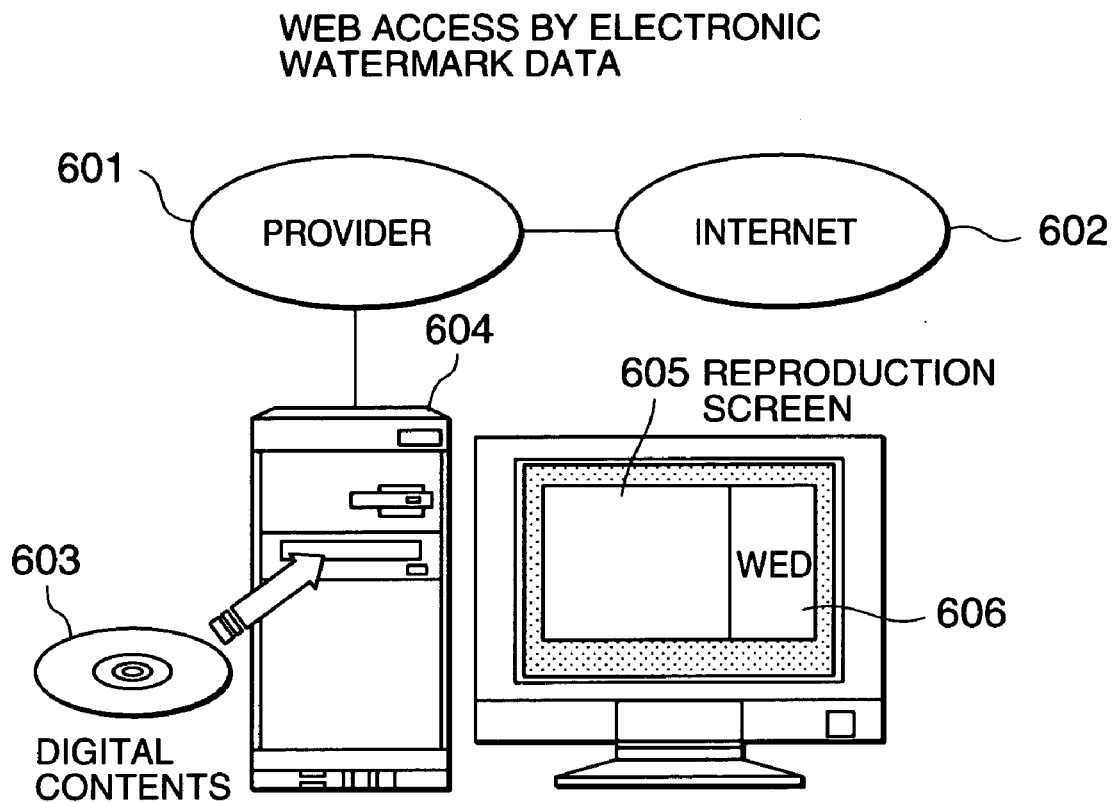
FIG. 6 is a block diagram showing the embodiment of the present invention.

Next, FIG. 6 shows an example of how to access a web site on the Internet based on the low-order four bits on a watermark. In this example, the table file contains URLs used to access web sites on the Internet. Numeral 605 indicates a screen on which a reproduced image is displayed. Numeral 606 indicates a screen on which the web page of an accessed web site is displayed.

A personal computer 604 reproduces digital contents 603. In parallel with this operation, the computer 603 extracts a watermark, compares the low-order four bits of the watermark with the information defined in the table file 607 and, based on the comparison result, performs a predetermined operation. For example, when the low-order four bits of the watermark are [0000], the computer does not display data on the screen 606. When the low-order four bits are [0001], the computer automatically accesses [http://abc] and displays the contents of the web page on the screen 606. When the low-order four bits are [0010], the computer accesses [http://def] and displays the contents of the web page on the screen 606.

Figure 7:
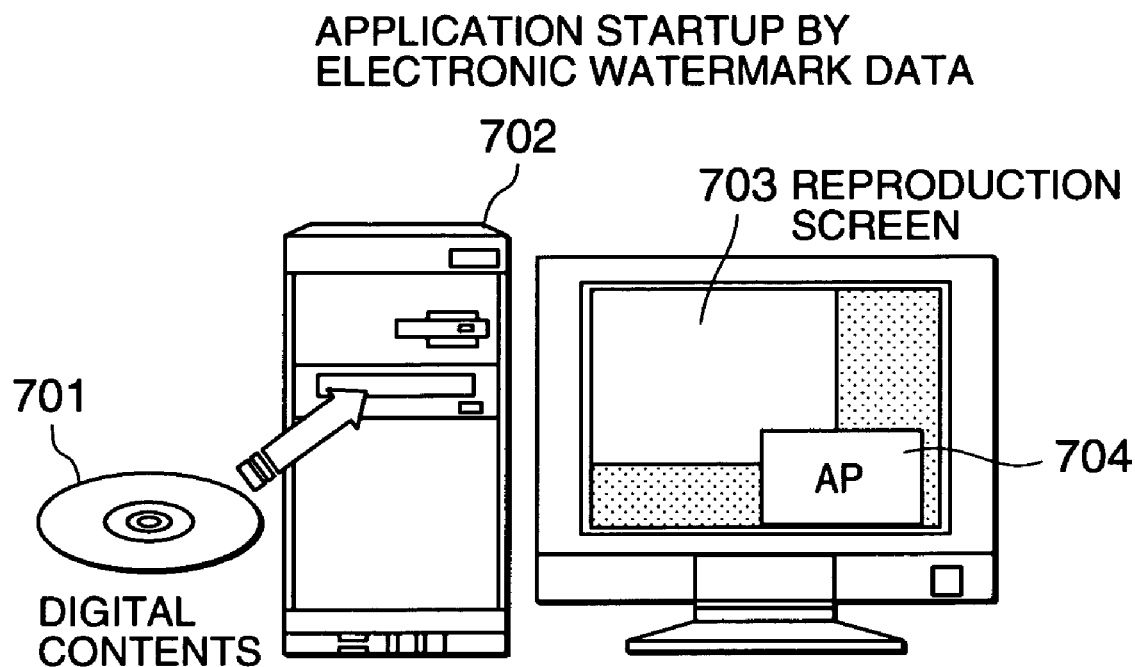
FIG. 7 is a block diagram showing the embodiment of the present invention.

Next, FIG. 7 shows an example of starting an application program based on the low-order four bits of the watermark. In this example, the table file contains the names of files used for executing application programs. Numeral 703 indicates a window in which a reproduced image is displayed, and numeral 704 indicates a window in which an application program is displayed.

A personal computer 702 reproduces digital contents 701. In parallel with this operation, the computer 702 extracts a watermark, compares the low-order four bits of the watermark with the information described in the table file 705 and, based on the comparison result, performs a predetermined operation. For example, when the low-order four bits of the watermark are [0000], the computer does not display data in the window 704. When the low-order four bits are [0001], the computer automatically starts application program A and displays the result in the window 704. When the low-order four bits are [0010], the computer starts application program B and displays the result in the window 704.

Although the table file is used in the three examples described above, ASCII-coded data may be inserted directly into an image as a watermark instead of using the table file. In this case, when the watermark is detected, a predetermined operation is executed. That is, character data coded, for example, in ASCII code may be inserted directly into the low-order four bits of a watermark. When the watermark is detected, the character data is displayed, a web site is accessed automatically, or an application program is started.

Finally, a system to which the electronic watermark detection device according to the present invention is applied will be described. Compressed data generated when a watermark is inserted and a table file are stored in a medium such as a DVD. They are distributed to an end user as digital contents 401. In general, the digital contents 401 are reproduced on a reproduction device such as a DVD player or a personal computer. In the description below, an example of reproduction on a personal computer will be described. A source filter 402 reads data from the digital contents 401. The data, once read, is split into video data and audio data by an MPEG splitter 403. Video data, generated by the splitting of the MPEG splitter 403, is decoded by a video decoder 405 and is output to a video renderer 408. At this time, the video decoder 405 outputs data, required for detecting a watermark, to a watermark detector 406. The watermark detector 406 detects a watermark based on the data and passes the detected result to an application 404 via the video decoder. The detected watermark is 8-bit information 411. The application 404 references the table file pre-stored in the digital contents and performs a predetermined operation as described above. A video renderer 408 performs processing for displaying decoded video data and displays the video.

Although the watermark is 8 bits in length and the device uses the low-order four bits of the eight bits in the above description, the watermark may be n bits in length (for example, 16 bits, 32 bits, etc.) and the device may use m bits (m=<n). That is, the number of bits of a watermark does not matter.

The device according to the present invention allows a watermark to be used not only for copy protection but also for other purposes. Therefore, the device finds more applications in the system without having to add major modifications to the conventional system.

What is claimed is:

1. A device that detects an electronic watermark from a compressed original image, comprising:
    a circuit which reads said compressed original image data, wherein the electronic watermark includes information consisting of first bits defined as CCI (copy protection) bits, second bits defined as reserved and third bits as undefined bit-data;
    a circuit which decodes said compressed original image to produce a decoded data;
    a circuit which performs inverse discrete cosine transform (IDCT) for said decoded data;
    a circuit which detects electronic watermark data embedded in data for which IDCT has been performed along with the value of said bit-data for which is defined a plurality of instructions;
    a table file including one of said instructions for said value of said bit-data; and
    a circuit which performs a processing according to said instruction in said table file.

2. The device according to claim 1 wherein the electronic watermark data is eight-bit data and said bit-data is four-bit data in the low order four bits of said electronic watermark.

3. The device according to claim 1 wherein characters are displayed according to said instruction corresponding to said bit-data.

4. The device according to claim 1 wherein a web site on the Internet is accessed according to said instruction corresponding to said bit-data.

5. The device according to claim 1 wherein an application program is started according to said instruction corresponding to said bit-data.

6. A method for detecting an electronic watermark from a compressed original image, comprising the steps of:
    reading a compressed original image data, wherein the electronic watermark includes information consisting of first bits defined as CCI (copy protection) bits, second bits defined as reserved and third bits as undefined bit-data;
    decoding said compressed original image data to produce a decoded data;
    performing inverse discrete cosine transform (IDCT) for said decoded data obtained from said decoding step;
    detecting electronic watermark data embedded in data for which IDCT has been performed, along with the value of said bit-data for which is defined a plurality of instructions; and
    performing processing according to an instruction obtained from a table file including a plurality of instructions corresponding to values of said bit-data and which includes an instruction for said value of said bit-data.

7. The method according to claim 6 wherein the electronic watermark is eight-bit data and said bit-data is four-bit data in the low order four bits of said electronic watermark.

8. The method according to claim 6 wherein characters are displayed according to said instruction.

9. The method according to claim 6 wherein a web site on the Internet is accessed according to said instruction.

10. The method according to claim 6 wherein an application program is started according to said instruction.

11. A computer-readable recording medium storing therein a program for detecting an electronic watermark embedded in an original image, said program causing a computer to:

read a compressed image data and a table data, said table data defining a plurality of instructions corresponding to said bit-data included in said electronic watermark, wherein said electronic watermark includes information consisting of first bits defined as CCI (copy protection) bits, second bits defined as reserved and third bits as undefined bit-data;

decode said compressed image data in which said electronic watermark is embedded to obtain decoded data;

perform inverse discrete cosine transform (IDCT) for decoded data;

detect electronic watermark data embedded in data for which IDCT has been performed; and perform processing according to one of said instructions in said table corresponding to said bit-data included in said electronic watermark.

12. A device that detects an electronic watermark from an original image, from an original image, comprising:

a circuit which reads said original image data;

a circuit which detects said electronic watermark, wherein said electronic watermark includes information consisting of first bits defined as CCI (copy protection) bits, second bits defined as reserved and third bits as undefined bit-data from said original image data along with the value of said bit-data for which is defined one of a plurality of instructions;

a table file including said plurality of said instructions corresponding to values of said bit-data; and a circuit which performs processing according to one of said instructions in said table file corresponding to the value of said bit-data contained in said original image.

13. The device according to claim 12 wherein the electronic watermark data is eight bit data and said bit-data is four bit data in the low order four bits of said electronic watermark.

* * * * *